United States Patent
Murata

(10) Patent No.: US 8,253,817 B2
(45) Date of Patent: Aug. 28, 2012

(54) IMAGE COMPRESSION METHOD, DEVICE, ELECTRONIC CAMERA, AND PROGRAM

(75) Inventor: Tsukasa Murata, Yamato (JP)

(73) Assignee: Nikon Corporation, Tokyo (JP)

( * ) Notice: Subject to any disclaimer, the term of this patent is extended or adjusted under 35 U.S.C. 154(b) by 455 days.

(21) Appl. No.: 12/309,444

(22) PCT Filed: Aug. 24, 2007

(86) PCT No.: PCT/JP2007/000906
§ 371 (c)(1),
(2), (4) Date: Jan. 16, 2009

(87) PCT Pub. No.: WO2008/038406
PCT Pub. Date: Apr. 3, 2008

(65) Prior Publication Data
US 2010/0007753 A1     Jan. 14, 2010

(30) Foreign Application Priority Data
Sep. 25, 2006   (JP) .................................. 2006-259094

(51) Int. Cl.
*H04N 5/235*   (2006.01)
*H04N 5/228*   (2006.01)
*G06K 9/46*    (2006.01)
(52) U.S. Cl. ..................................... 348/222.1; 382/240
(58) Field of Classification Search .................. None
See application file for complete search history.

(56) References Cited

U.S. PATENT DOCUMENTS
| | | | | |
|---|---|---|---|---|
| 4,831,659 A | * | 5/1989 | Miyaoka et al. | 382/240 |
| 4,987,480 A | * | 1/1991 | Lippman et al. | 348/396.1 |
| 5,209,220 A |   | 5/1993 | Hiyama et al. | |
| 5,351,095 A | * | 9/1994 | Kerdranvat | 348/699 |
| 5,448,297 A | * | 9/1995 | Alattar et al. | 375/240.12 |
| 5,608,458 A | * | 3/1997 | Chen et al. | 375/240.14 |

(Continued)

FOREIGN PATENT DOCUMENTS
JP     A-01-179584     7/1989
(Continued)

OTHER PUBLICATIONS
Office Action dated Jul. 5, 2011 issued in Japanese Patent Application No. 2006-259094. (with English Language translation).

*Primary Examiner* — Sinh Tran
*Assistant Examiner* — Jason Flohre
(74) *Attorney, Agent, or Firm* — Oliff & Berridge, PLC

(57) ABSTRACT

An image compression device includes a motion vector detecting section, a determination section, an intra-frame compression section, and an inter-frame compression section. The motion vector detecting section obtains a motion vector between sets of image data at a plurality of positions on an image. The determination section determines whether a spatial variation of the motion vector on the image is large or small. The intra-frame compression section selects an image area A, which is determined to have the large spatial variation of the motion vector, from the image data to be compressed, and subjects the selected image area A to intra-frame compression. The inter-frame compression section selects an image area B, which is determined to have the small spatial variation of the motion vector, from the image data to be compressed, and subjects the selected image area B to inter-frame prediction differential compression.

5 Claims, 14 Drawing Sheets

U.S. PATENT DOCUMENTS

| | | | |
|---|---|---|---|
| 5,748,242 A * | 5/1998 | Podilchuk | 348/391.1 |
| 5,768,434 A * | 6/1998 | Ran | 382/240 |
| 5,995,668 A * | 11/1999 | Corset et al. | 382/233 |
| 6,052,150 A * | 4/2000 | Kikuchi et al. | 375/240.16 |
| 2002/0181745 A1* | 12/2002 | Hu | 382/107 |
| 2003/0021485 A1* | 1/2003 | Raveendran et al. | 382/244 |
| 2004/0096114 A1* | 5/2004 | Tomita et al. | 382/239 |
| 2004/0156552 A1 | 8/2004 | Larrieu et al. | |
| 2007/0047649 A1* | 3/2007 | Suzuki et al. | 375/240.15 |
| 2007/0070059 A1* | 3/2007 | Rojer | 345/418 |

FOREIGN PATENT DOCUMENTS

| | | |
|---|---|---|
| JP | A-4-152930 | 5/1992 |
| JP | A-05-153576 | 6/1993 |
| JP | A-2000-050263 | 2/2000 |
| JP | A-2005-012372 | 1/2005 |
| JP | A-2006-238041 | 9/2006 |

* cited by examiner

IMAGE COMPRESSION METHOD, DEVICE, ELECTRONIC CAMERA, AND PROGRAM

CROSS-REFERENCE TO THE RELATED APPLICATIONS

This application is a U.S. National Stage application claiming the benefit of prior filed International Application Number PCT/JP2007/000906, filed Aug. 24, 2007, in which the International Application claim a priority date of Sep. 25, 2006 based on prior filed Japanese Application Number 2006-259094, the entire contents of which are incorporated herein by reference.

TECHNICAL FIELD

The present invention relates to an image compression method, an image compression device, an electronic camera, and an image processing program.

BACKGROUND ART

Conventionally, the MPEG2 method is known for an image compression method of a moving image (refer to the following Patent document 1 or the like). In this MPEG2 method, moving images are classified into frame types such as the following (1) to (3), and image compression processing is switched for each frame.
(1) I picture: I picture is extracted every predetermined number of frames from the moving images, and this I picture is subjected to intra-frame compression.
(2) P picture: P picture located between the I pictures is extracted. A motion prediction frame is generated from the preceding I picture, and an inter-frame difference (inter-frame prediction difference) between the motion prediction frame and this P picture is obtained. Then the data of this inter-frame prediction difference is compressed.
(3) B picture: B picture located between the I picture and the P picture is extracted. The motion prediction frame is generated from the preceding or succeeding I picture and P picture, and the inter-frame difference (inter-frame prediction difference) between the motion prediction frame and this B picture is obtained. Then, data of this inter-frame prediction difference is compressed.
Patent document 1: Japanese Unexamined Patent Application Publication No. 2005-12372 (paragraph [0002] and the like)

DISCLOSURE

Problems to be Solved

As mentioned above, a prior art switches between the intra-frame compression and the inter-frame prediction differential compression for each frame such as the I picture, the P picture, or the B picture.

However, the prior art does not sectionalize image data of one frame into a plurality of image areas and does not switch between the intra-frame compression and the inter-frame prediction differential compression for each of these image areas.

Accordingly, the present invention aims at providing a technique to switch between the intra-frame compression and the inter-frame prediction differential compression for each of the image areas.

Means for Solving the Problems

<1> An image compression method of the present invention is one that compresses data of an image data group, and includes the following steps.
(1) Step of obtaining a motion vector between the sets of image data for a plurality of positions on an image
(2) Step of determining whether variation of the motion vector on the image (hereinafter, called spatial variation) is large or small
(3) Step of selecting an image area A, which is determined to have the large spatial variation of the motion vector, from the image data to be compressed, and subjecting the selected image area A to intra-frame compression
(4) Step of selecting an image area B, which is determined to have the small spatial variation of the motion vector, from the image data to be compressed, and subjecting the selected image area B to inter-frame prediction differential compression <2> An image compression device of the present invention is one that compresses data of an image data group and includes a motion vector detecting section, a determination section, an intra-frame compression section, and an inter-frame compression section. The motion vector detecting section obtains a motion vector between the sets of image data for a plurality of positions on an image. The determination section determines whether variation of the motion vector on the image (hereinafter, called spatial variation) is large or small. The intra-frame compression selects an image area A, which is determined to have the large spatial variation of the motion vector, from the image data to be compressed, and subjects the selected image area A to the intra-frame compression. The inter-frame compression section selects an image area B, which is determined to have the small spatial variation of the motion vector, from the image data to be compressed, and subjects the selected image area B to the inter-frame prediction differential compression.

<3> Further, the motion vector detecting section preferably includes a sectionalizing section and a searching section. The sectionalizing section performs hierarchical block sectionalization by sectionalizing the image data into blocks and further sectionalizes the blocks. The searching section first obtains a motion vector of the block in a higher hierarchy, and with the motion vector as a starting position, searches for a motion vector of the block in a lower hierarchy. The determination section terminates the block sectionalization in the lower hierarchy under a termination condition that a motion vector variation of the block between the hierarchies is stabilized within a predetermined acceptable amount. The intra-frame compression section selects a block with a final section size being smaller than a predetermined size, sets the block being selected as the image area A, and subjects the image area A to intra-frame compression. On the other hand, the inter-frame compression section selects a block with a final section size being larger than the predetermined size, sets the block being selected as the image area B, and subjects the image area B to inter-frame prediction differential compression.

<4> Still further, the determination section terminates further sectionalization of the block before a hierarchical block section size becomes smaller than the predetermined size. In this case, the intra-frame compression section assumes that a block in which block sectionalization being terminated without satisfying the termination condition is the block with the final section size being smaller than the predetermined size, and subjects the block to intra-frame compression. On the other hand, the inter-frame compression section subjects the block in which the block sectionalization being terminated by satisfying the termination condition to inter-frame prediction differential compression.

<5> Moreover, the image compression device preferably includes a chrominance compression section subjecting the chrominance component to intra-frame compression. When a color image including a luminance component and the chrominance component is input as the image data, the chrominance component is subjected to the intra-frame compression by the chrominance compression section. On the other hand, the luminance component is subjected to the compression processing by the above intra-frame compression section and inter-frame compression section in the image areas A and B, respectively.

<6> An electronic camera of the present invention includes the image compression device according to any one of <2> to <5> and an imaging section generating an image data group by imaging an object. This image compression device compresses data of the image data group generated by the imaging section.

<7> An image processing program of the present invention is a program for causing a computer to function as the image compression device according to any one of <2> to <5>.

According to the present invention, by sectionalizing the image data into the image areas, it becomes possible to switch between the intra-frame compression and the inter-frame prediction differential compression, adaptively for each of the image areas.

DETAILED DESCRIPTION OF THE EMBODIMENTS

<Description of a Configuration of an Embodiment>

Figure 1:
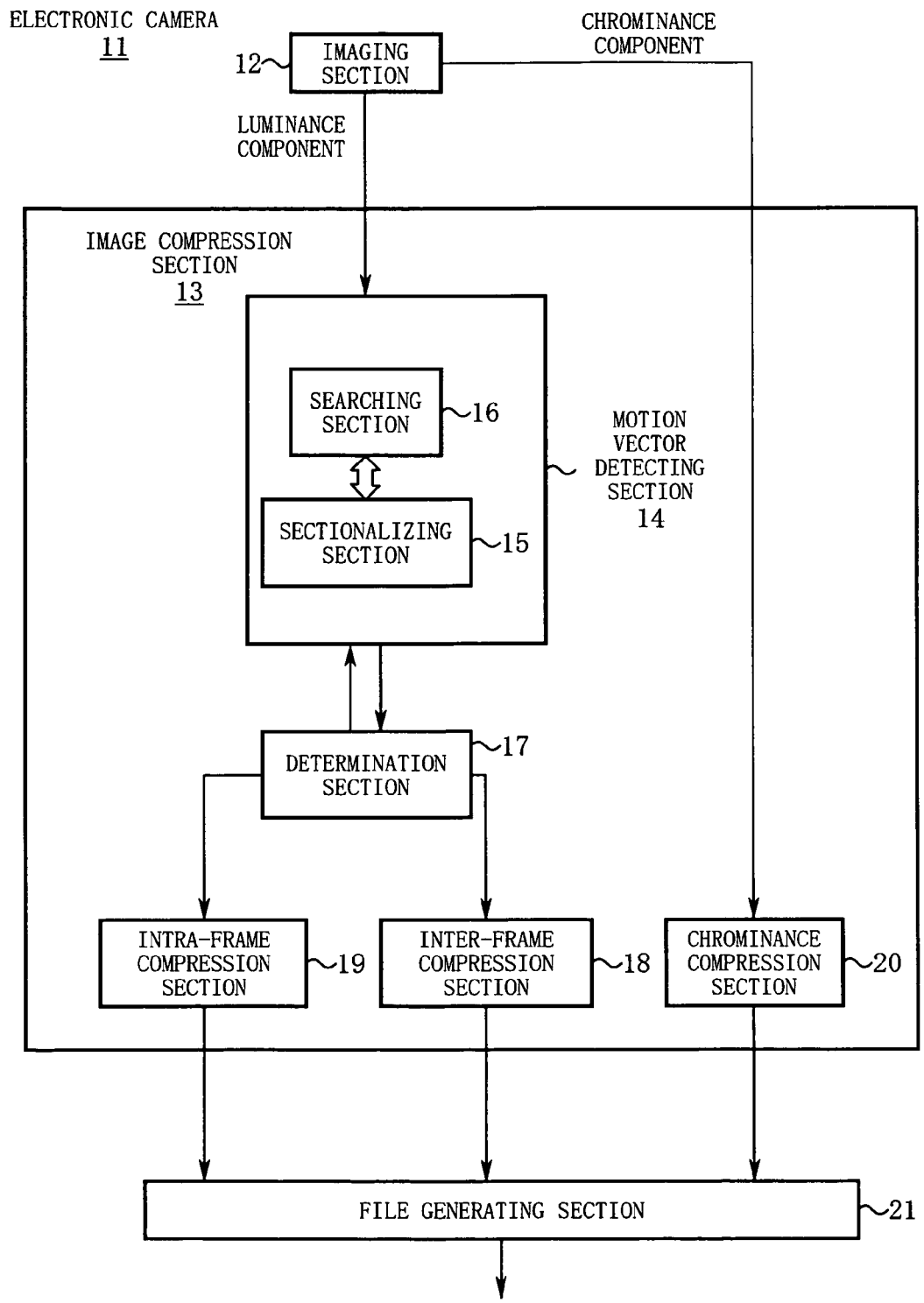
FIG. 1 is a block diagram showing a configuration of an electronic camera 11.

FIG. 1 is a block diagram showing a configuration of an electronic camera 11. In FIG. 1, the electronic camera 11 schematically includes an imaging section 12 carrying out continuous shooting or movie shooting of an object and generating an image data group, and an image compression section 13 compressing an image of the image data group. In addition, the electronic camera 11 is provided with a file generating section 21 generating one or more compressed files by putting together plural types of compressed data generated by the image compression section 13.

The above image compression device 13 includes the following constituents.

(1) Motion vector detecting section 14: obtaining the pattern motion vector between the image data (called standard image) and the image data (called reference image) at a plurality of positions on the image. Note that this motion vector detecting section 14 includes a sectionalizing section 15 and a searching section 16.

(2) Determination section 17: determining whether spatial variations on the image for the motion vectors at the plurality of positions is large or small.

(3) Intra-frame compression section 18: selecting an image area A, which has the large spatial variation of the motion vector, from the image data to be compressed, and subjecting the selected image area A to intra-frame compression.

(4) Inter-frame compression section 19: selecting an image area B, which has the small spatial variation of the motion vector, from the image data to be compressed, and subjecting the selected image area B to inter-frame prediction differential compression.

(5) Chrominance compression section 20: subjecting a chrominance component of the image data group to the intra-frame compression.

<Description of the Operation of the Embodiment>

First, operation of the motion vector detection will be described in advance.

Subsequently, the image compression processing applying the motion vector detection to area sections of the image data will be described.

[Main Routine of the Motion Vector Detection]

Figure 2:
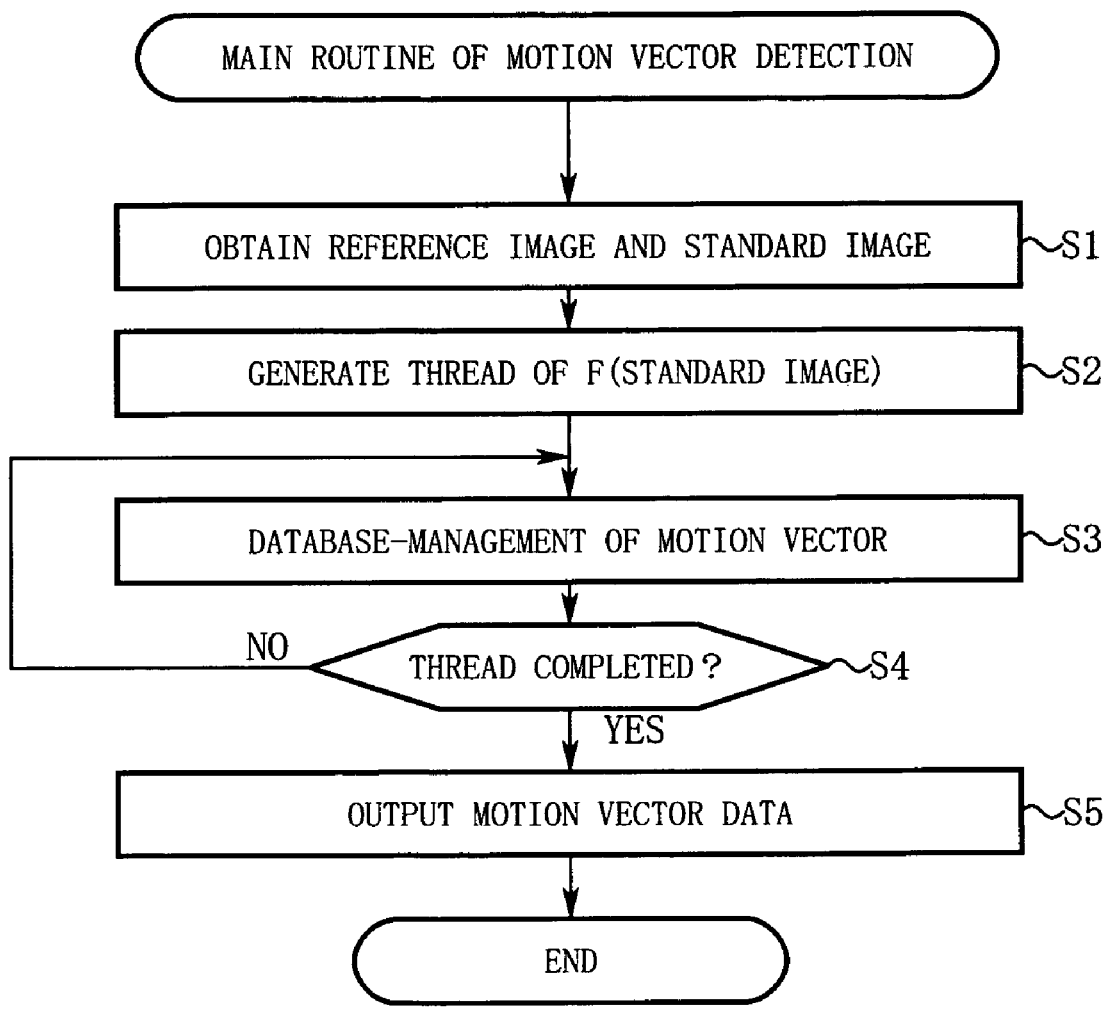
FIG. 2 is a flowchart describing a main routine of motion vector detection.

FIG. 2 is a flowchart describing a main routine of the motion vector detection. In the following, this operation will be described along the step numbers shown in FIG. 2.

Step S1: The motion vector detecting section 14 obtains two sets of the image data, which have a high similarity, selectively from the image data group, and sets the image data to be the standard image and the reference image. For selecting these two sets of image data, it is preferable to select the image data which have the high similarity such as a close shooting time or a small inter-frame difference.

Out of the two sets of image data, one reference image is stored into a memory area managed by the searching section 16. The other standard image is stored into another memory area managed by the sectionalizing section 15.

Note that the reference image and the standard image may not be stored directly and edge components of the reference image and the standard image may be stored instead. This processing can omit an edge extraction processing for each block, which will be described hereinafter.

Step S2: The motion vector detecting section 14 generates a thread for initiating parallel computation of the motion vector in a hierarchical direction. This thread is provided with an argument calling the standard image and the like by reference and calls a function F( ) to be described below.

The thread generated here is a source parent thread. In this parent thread, a similar child thread is generated recursively in plural numbers, and thereby the hierarchical detection operation of the motion vectors is carried out variously in parallel with the operation of the present main routine.

Step S3: The motion vector detecting section 14 receives a report of the motion vector sequentially from the above hierarchical thread. The motion vector detecting section 14 classifies the reported motion vectors into a hierarchical structure and manages the data in a database.

Step S4: The motion vector detecting section 14, after having received a report of the thread completion from the parent thread, moves the operation to Step S5. On the other hand, if the processing of the parent thread has not been completed, the motion vector detecting section 14 returns the operation to Step S3.

Figure 3:
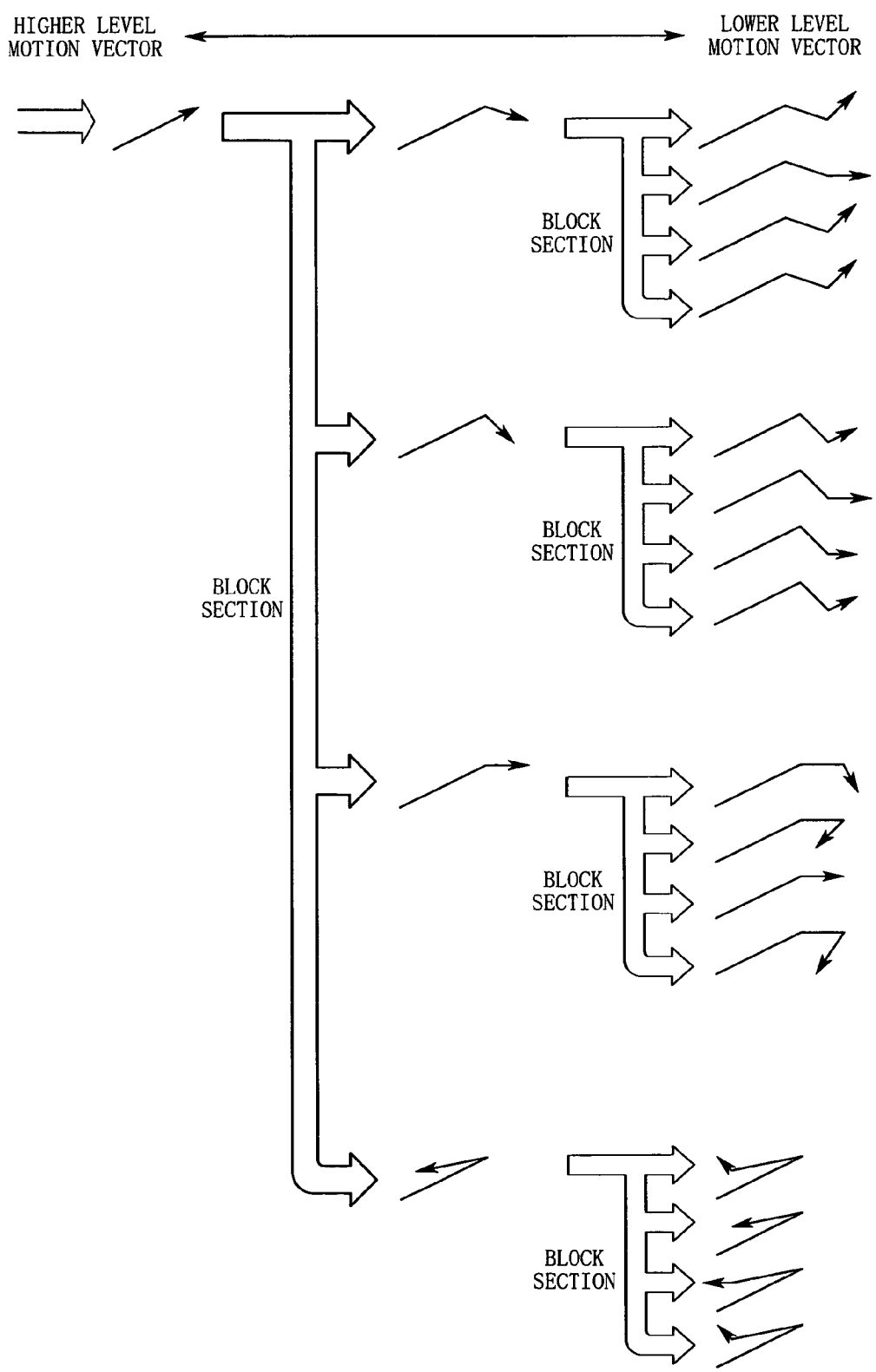
FIG. 3 is a diagram schematically showing an example of tree-structured data.

Step 5: The motion vector detecting section 14 forms the motion vectors registered in the database into a tree structure according to the corresponding block hierarchy. The motion vector detecting section 14 outputs the tree-structured motion vector data to outside. FIG. 3 is a diagram schematically showing an example of this tree-structured data. By carrying out processing control of the function F (block) (interruption of the motion vector detection, change of the detection method, etc.) in the lower hierarchy according to this tree-structured data, it is possible to perform the motion vector detection efficiently.

[Thread Processing of the Motion Vector Detection]

Figure 4:
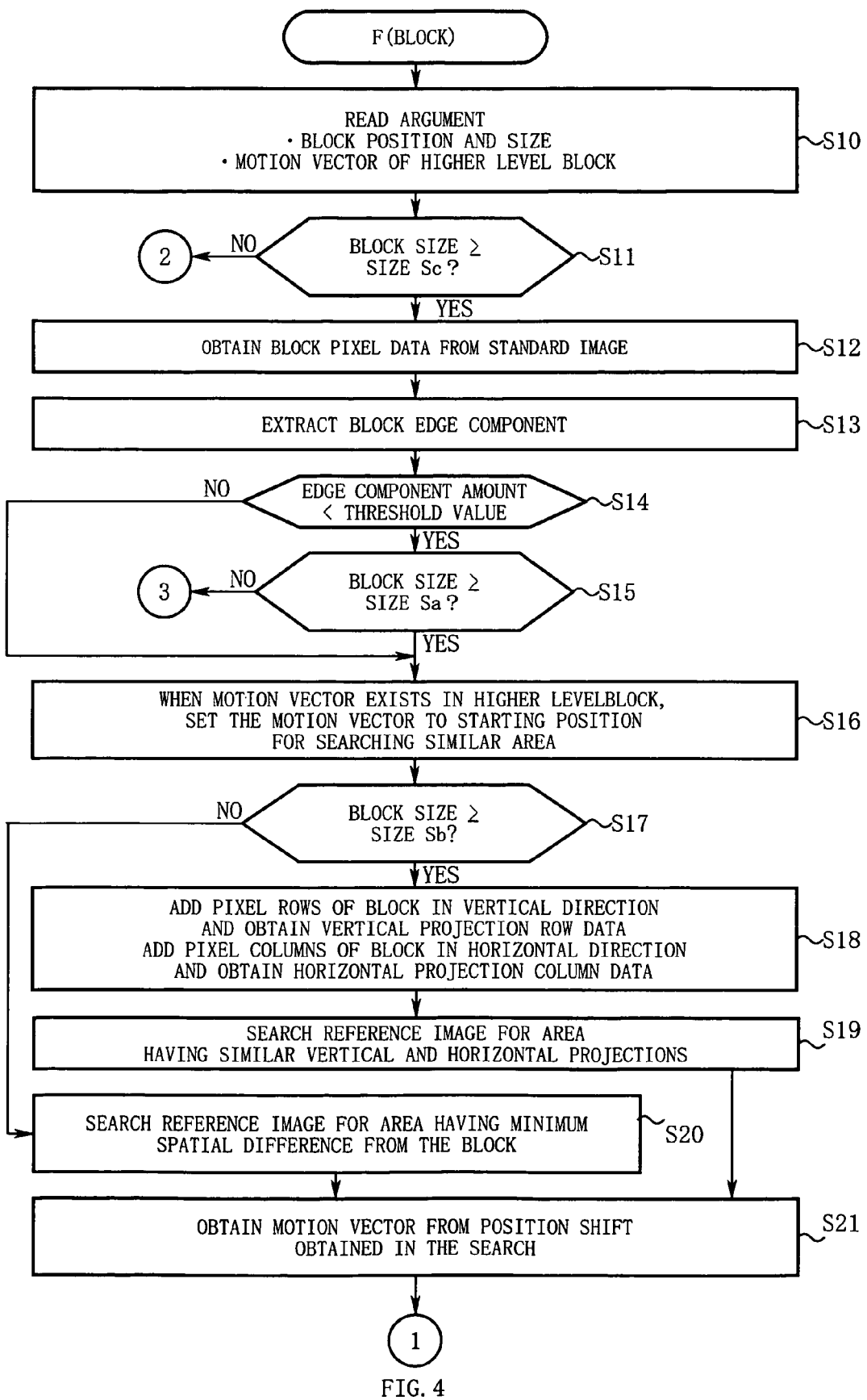
FIG. 4 is a flowchart describing process control of a function F (block) (1/2).
Figure 5:
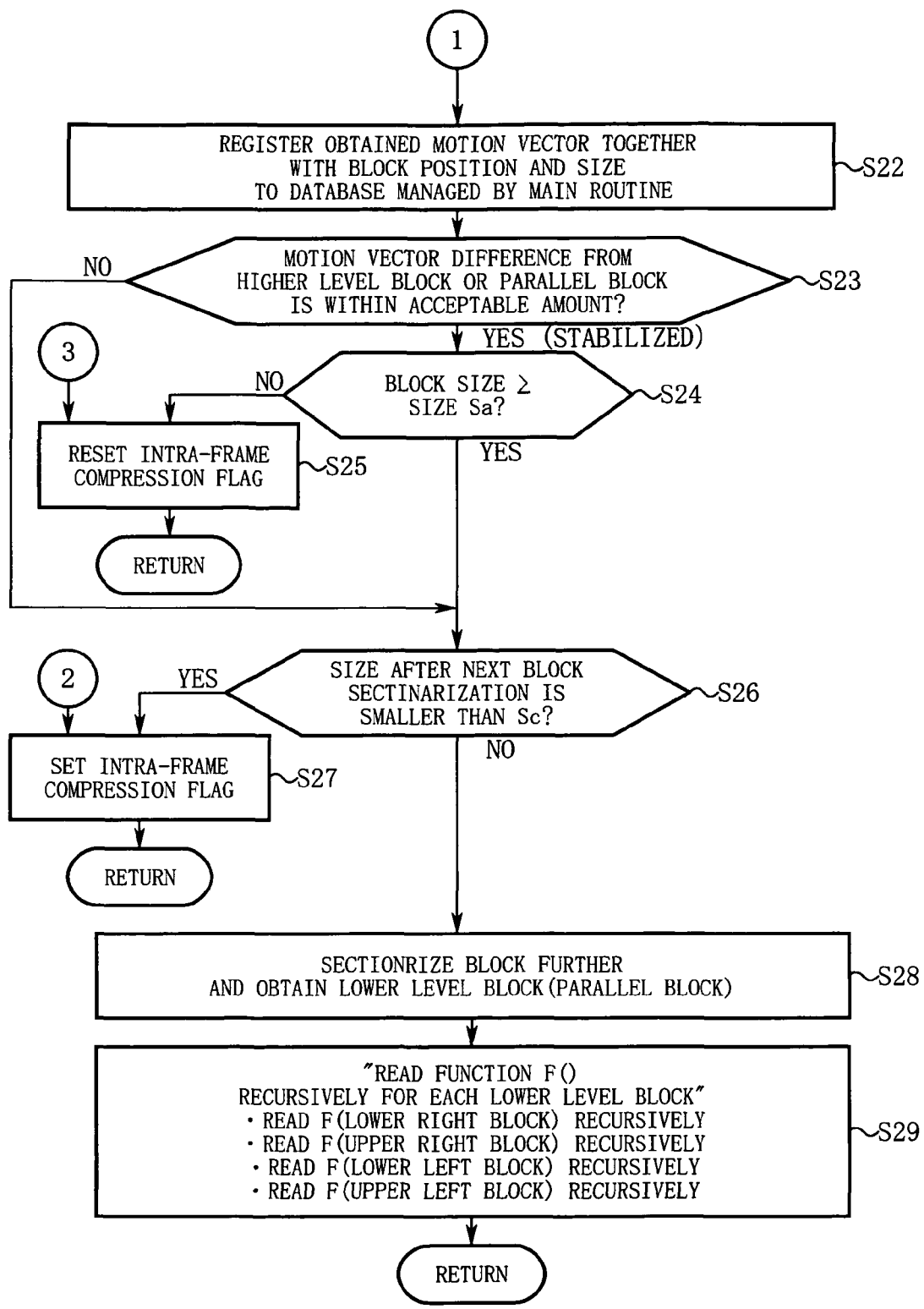
FIG. 5 is a flowchart describing process control of a function F (block) (2/2).

FIG. 4 and FIG. 5 are flowcharts describing specific processing control of the function F (block), which is carried out by a unit of the above mentioned thread. In the following, this operation by a unit of thread will be described along the step numbers shown in FIG. 4 and FIG. 5.

Step 10: The sectionalizing section 15 reads the argument provided to the function F (block).

This argument includes a block position (e.g., coordinates of the upper-left point of the block) and a block size (e.g., vertical and horizontal pixel numbers of the block) of the standard image. Further, when the motion vector is known for the block or the higher level block, the argument also includes this motion vector data.

Step S11: The searching section 16 determines whether the block size in the argument is larger than a predetermined size Sc or not. This predetermined size Sc defines the block size of the minimum unit, for which the motion vector detection is to be carried out.

If the block size in the argument is larger than the predetermined size Sc, the searching section 16 moves the operation to Step S12 for carrying out the motion vector detection. On the other hand, if the block size in the argument is smaller than the predetermined size Sc, the searching section 16 moves the operation to Step S27. This branch processing can terminate the hierarchical detection operation of the motion vector before the block becomes too small.

Step S12: The sectionalizing section 15 obtains the block pixel data from the standard image according to the argument and transfers the data to the searching section 16.

Step S13: The searching section 16 extracts an edge component from this block pixel data using a spatial frequency filter. The searching section 16 obtains an absolute value sum of the edge components in the block, and makes the sum to be an edge component amount.

Step S14: The searching section 16 determines whether the edge component amount of the block is smaller than a predetermined threshold value or not. This threshold value defines a recommended lower limit of the edge amount desirable for detecting the motion vector.

If the edge component included in the block is this threshold value or more, the searching section 16 moves the operation to Step S16. On the other hand, if the edge component included in the block is smaller than the threshold value, the searching section 16 moves the operation to Step S15.

Step S15: The searching section 16 determines whether the block size is not less than a predetermined size Sa or not. This size Sa defines the block size, for which the motion vector detection is to be continued without depending on the termination condition of Step 14.

If the block size is not less than the size Sa, the searching section 16 moves the operation to Step S16 for detecting the motion vector. This operation can prevent the motion vector detection from being terminated in the stage of a comparatively large block size.

On the other hand, if the block size is smaller than the size Sa, the searching section 16 moves the operation to Step S25. This branch processing terminates the hierarchical detection operation of the motion vector sequentially from the block in which the edge component becomes small.

Step S16: The searching section 16, if the motion vector is known for the block or the higher level block, sets this motion vector to the start position of searching for the similar area.

Step S17: The searching section 16 determines whether the block size is not less than a predetermined size Sb or not. This size Sb indicates a guide for switching the search method for the similar area, and is to be determined preferably by consideration of the matching between each of the search methods and the block size.

If the block size is not less than the size Sb, the searching section 16 moves the operation to Step S18. On the other hand, if the block size is smaller than the size Sb, the searching section 16 moves the operation to Step S20.

Step S18: Here, since the block size is large, processing load is reduced by a process detecting the motion vector using a projection component.

Figure 6A:
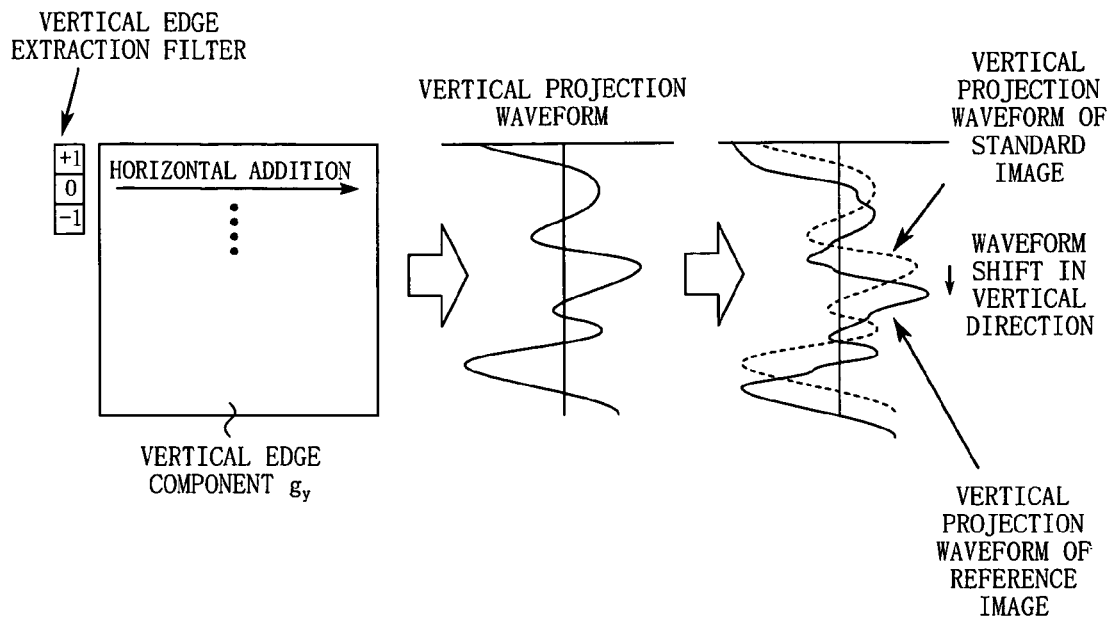
FIGS. 6A and 6B are diagrams illustrating states of calculating a projection component.
Figure 6B:
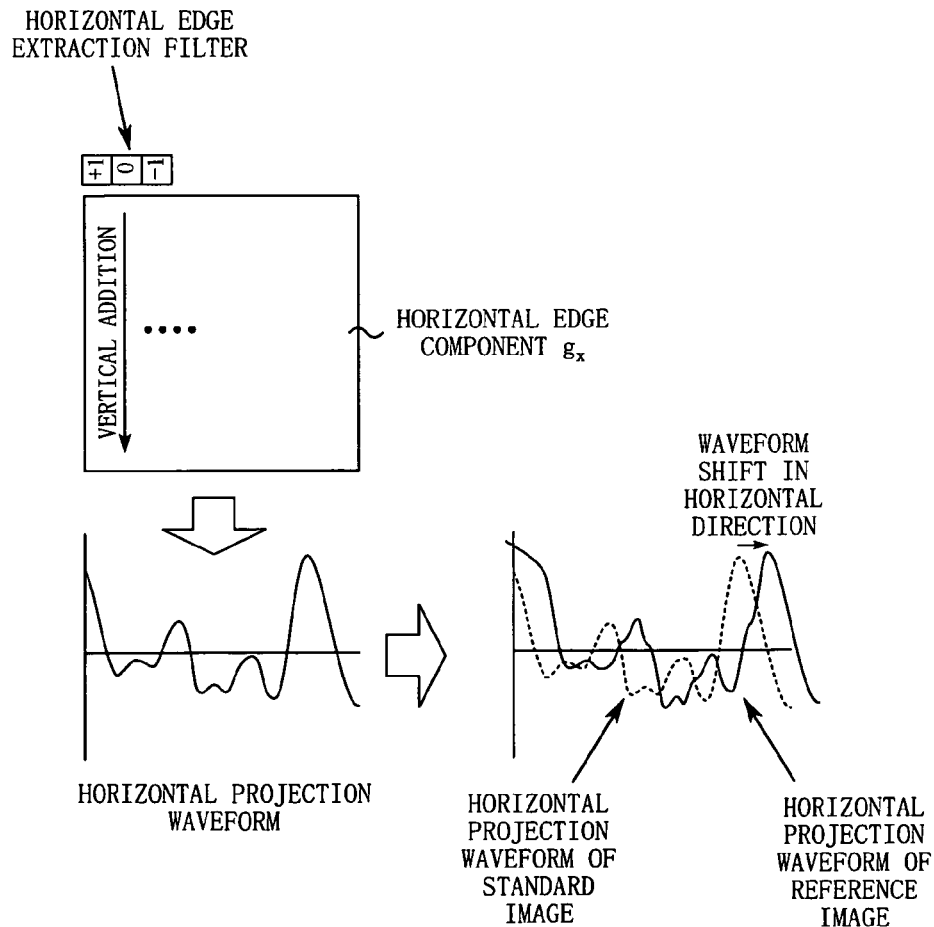

FIGS. 6A and 6B are diagrams showing states of calculating this projection component. First, the searching section 16 extracts a vertical edge component gy from the block of the standard image using a vertical edge extraction filter shown by the following formula (refer to FIG. 6A).

$$gy(x,y) = -f(x,y-1) + f(x,y+1)$$

Further, the searching section 16 extracts an horizontal edge component gx from the block of the standard image using a horizontal edge extraction filter shown by the following formula (refer to FIG. 6B).

$$gx(x,y) = -f(x-1,y) + f(x+1,y)$$

Note that, for reducing influence of noise, the searching section 16 preferably replaces the vertical edge component gy and the horizontal edge component gx falling within small predetermined amplitude with zeros.

Next, the searching section 16 calculates a vertical projection waveform by adding the vertical edge component gy cumulatively for each horizontal line, as shown in FIG. 6A.

Further, the searching section 16 calculates a horizontal projection waveform by adding the horizontal edge component gx cumulatively for each vertical line, as shown in FIG. 6B.

Note that the searching section 16 carries out similar processing as in Step 18 and obtains the vertical projection waveform and the horizontal projection waveform preliminarily for the entire area of the reference image.

Step 19: As shown in FIG. 6A, the searching section 16 obtains a difference between the vertical projection waveform of the standard image block and the vertical projection waveform of the reference image block by shifting the waveforms, and searches for the waveform shift which provides the minimum absolute value sum or the minimum square sum of the difference. At this time, it is preferable to reduce the search time by setting the motion vector in the higher level block, which is set in Step 16, to the start position of the search. The waveform shift thus obtained corresponds to a position shift between the standard image block and the reference image block in the vertical direction.

Note that it is preferable to compare the absolute value sums of the differences, which require small calculation amounts, for the block size of a threshold value (e.g., 100 pixels in the vertical direction) or more. Further, it is preferable to compare the square sums, which respond sensitively to a variation of the difference, for the block size smaller than the threshold value (e.g., 100 pixels in the vertical direction).

Further, as shown in FIG. 6B, the searching section 16 carries out the same processing also for the horizontal direction, and detects the position shift in the horizontal direction between the standard image block and the reference image block. After finishing the above search operation, the searching section 16 moves the operation to Step S21.

Step 20: The searching section 16 searches the reference image for the similar area which provides the minimum spatial difference from the block (absolute value sum or square sum of the difference in each pixel). Note that it is preferable to compare the absolute value sums, which require small computation amounts, for the block size of a threshold value (e.g., 100 pixels in the vertical direction) or more. Further, it is preferable to compare the square sums, which respond sensitively to the variation of the difference, for the block size smaller than the threshold value (e.g., 100 pixels in the vertical direction).

Step S21: The searching section 16 obtains the motion vector between the standard image and the reference image at this block position using the position shift obtained in Step 19 or Step S20.

Step S22: The searching section 16 registers the motion vector obtained in Step S21 and the block position and size to the database managed by the main routine (motion vector detecting section 14).

Step S23: The determination section 17 obtains a difference (spatial variation) between the motion vector in the higher level block (or adjacent block) and the motion vector obtained in Step S21.

If a magnitude of this spatial variation in the motion vector falls within an acceptable amount of error or the like, the determination section 17 determines that the motion vector variation is stabilized, and moves the operation to Step S24. On the other hand, if the magnitude of the spatial variation in the motion vector exceeds the acceptable amount of error or the like, the determination section 17 determines that it is necessary to continue the motion vector detection, and moves the operation to Step S26.

Step S24: The determination section 17 determines whether the block size is not less than the predetermined size Sa or not. This size Sa defines the block size, for which the motion vector detection is to be continued without depending on the termination condition of Step S23.

If the block size is not less than the size Sa, the determination section 17 moves the operation to Step S26 in order to continue the motion vector detection. On the other hand, if the block size is smaller than the size Sa, the determination section 17 moves the operation to Step S25.

Step S25: The determination section 17 resets an intra-frame compression flag for the block currently being processed. This flag operation enables the inter-frame prediction differential compression to be carried out for this block in the subsequent stage of the image compression processing.

After completing such flag operation, the determination section 17 returns the operation to the read-out source of the function F (block). This return processing terminates the hierarchical detection operation of the motion vector sequentially from the block in which the motion vector is stabilized.

Step 26: The determination section 17 determines whether the block size becomes smaller than the predetermined size Sc or not, by the block sectionalization in Step S28 to be described below.

Here, if the block size becomes smaller than the predetermined size Sc, the determination section 17 moves the operation to Step S27. On the other hand, if the block size becomes not less than the predetermined size Sc, the determination section 17 moves the operation to Step S28.

Step S27: The determination section 17 sets the intra-frame compression flag for the block currently being processed. This flag operation enables the intra-frame compression to be provided to this block in the subsequent stage image compression processing.

After completing such flag operation, the determination section 17 returns the operation to the read-out source of the function F (block). This return processing can omit unnecessary sectionalization for the block which requires the intra-frame compression processing determinately.

Step S28: The sectionalizing section 15 obtains a lower level block (parallel block) by sectionalizing the block into two by two, for example. This sectionalizing pattern or number of sections may be changed flexibly according to the tree-structured data of the motion vector. For example, the number of sections of the block may be increased in the higher hierarchy and the number of sections of the block may be decreased in the lower hierarchy. By such processing control, it is possible to prevent the motion vector hierarchy from becoming too deep.

Step S29: This step generates a child thread for each of the lower level blocks sectionalized in Step S28 and carries out recursive read-out of the function F (block) for each of the child threads. After all the recursive read-outs of these child threads have returned, this step returns the operation to the read-out source of the function F (block).

[Description of the Image Compression Operation]

Figure 7:
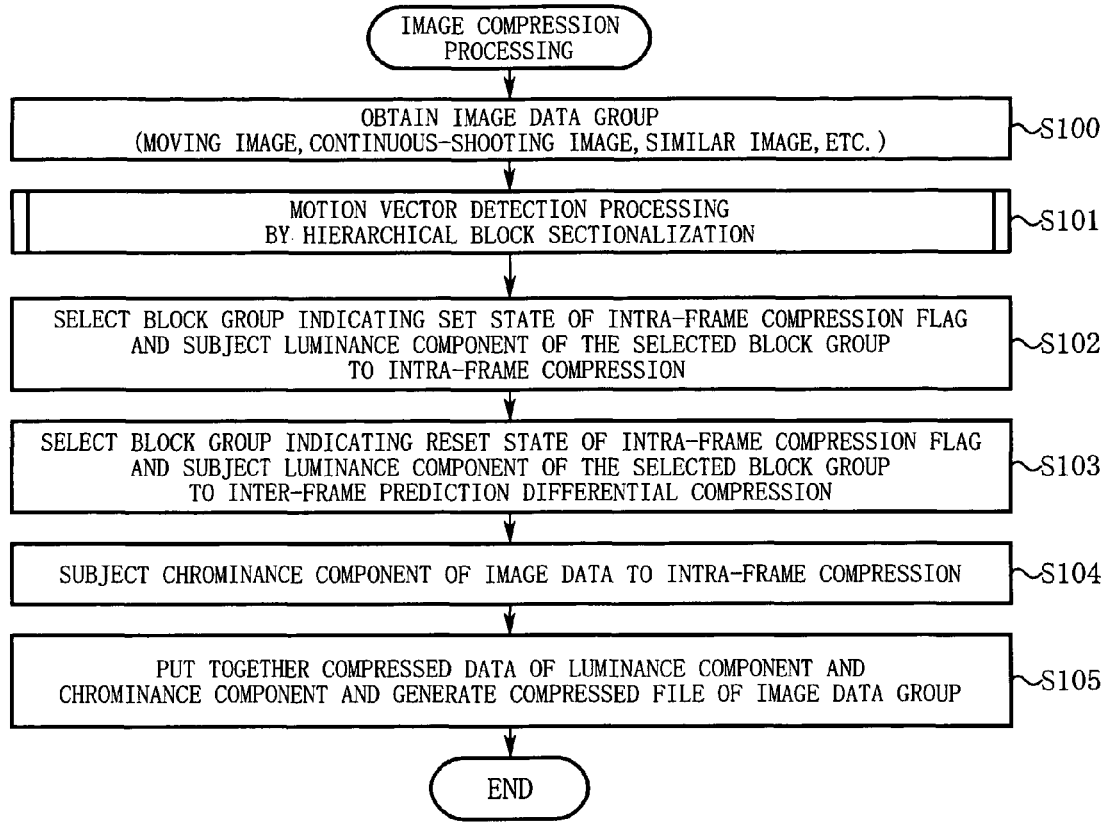
FIG. 7 is a flowchart describing operation of image compression.

FIG. 7 is a flowchart describing the image compression operation. In the following, this operation will be described along the step numbers of FIG. 7.

Step S100: The image compression device 13 obtains the image data group from the imaging section 12.

Step S101: The image compression device 13 sorts the order of the image data group such that the image data sets having similar patterns neighbor to each other (here, the image compression device 13 may only arrange the image data sets in the order of shooting time).

Figure 8:
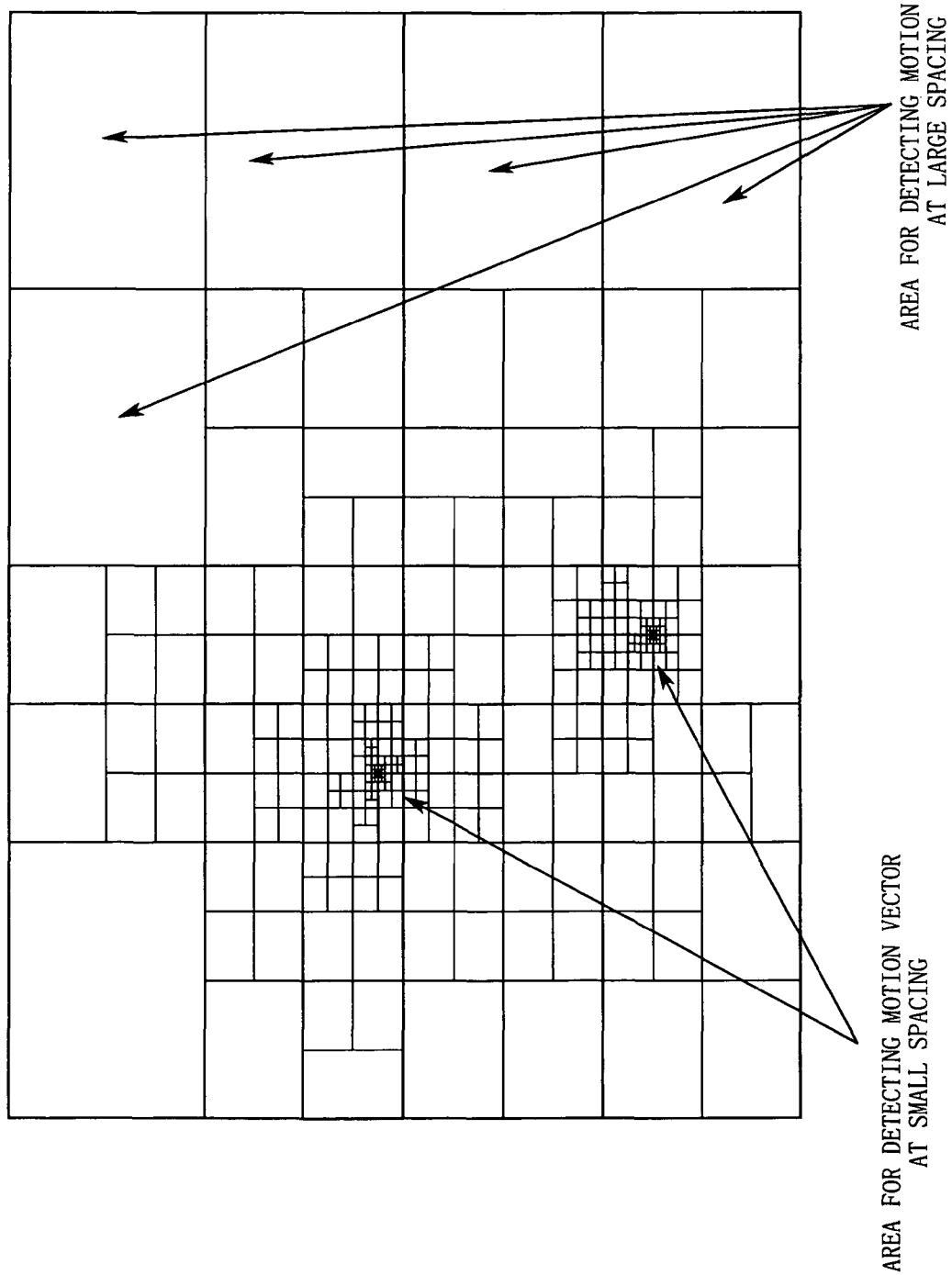
FIG. 8 is a diagram showing an example of a block section of an image.

The image compression device 13 carries out the above motion vector detection processing (FIG. 2, FIG. 4, and FIG. 5) between the neighboring sets of image data using the motion vector detecting section 14 and the determination section 17. As a result, each set of the image data is sectionalized into blocks with different sizes as shown in FIG. 8.

Step S102: The intra-frame compression section 18 selects a block group, which indicates the set state of the intra-frame compression flag (refer to Step S27), from the image data to be compressed. The intra-frame compression section 18 makes the selected block group to be the image area A and subjects the luminance component of this image area A to the intra-frame compression.

The intra-frame compression here may use any image compression method in which the image compression is completed within a frame. For example, it is optional to obtain the difference data of the luminance component between neighboring pixels and to compress the difference data using the variable length encoding, the run-length encoding, or the like.

Alternatively, it is optional to carry out the image compression using an orthogonal transformation such as one in the JPEG method.

Note that the intra-frame compression may be carried out by sectionalizing the image area A into small units such as blocks or tiles. Alternatively, the intra-frame compression may be carried out for the entire area of the image area A.

Step S103: The inter-frame compression section 19 selects a block group, which indicates the reset state of the intra-frame compression flag (refer to Step S25), from the image data to be compressed. The inter-frame compression section 19 makes the selected block group to be the image area B and subjects the luminance component of this image area B to the inter-frame prediction differential compression.

For example, the inter-frame compression section 19 obtains a section shifted by the motion vector from a section of the standard image block and cuts out a block (motion compensation block) corresponding to this shifted section from the reference image. Then, the inter-frame compression section 19 obtains a block difference of the luminance component between the standard image block and the motion compensation blocks of the reference image. The inter-frame compression section 19 compresses and encodes this block difference. The inter-frame compression section 19 generates compressed data by putting together the obtained compression result of the block difference and encoded data of the motion vector.

Step S104: The chrominance compression section 20 obtains the chrominance components (Cb, Cr, etc.) of the image data group from the imaging section 12 and subjects these chrominance components to the intra-frame compression. The intra-frame compression here also may use the image compression method in which the image compression is completed within the frame.

Note that it is optional further to improve the compression efficiency by providing the chrominance components with sub-sampling (4:2:2, 4:1:1, 4:2:0, etc.).

Step S105: The file generating section 21 generates a compressed file of the image data group by putting together the following compressed data (1) to (3) generated in Steps S102 to S103, and additional information required in image decompression (information of the image areas A and B and the block layout, motion vector for each block of the image area B, etc.).

(1) Compressed data of the luminance component obtained by the intra-frame compression in the image area A (2) Compressed data of the luminance component obtained by the inter-frame prediction differential compression in the image area B (3) Compressed data of the chrominance component obtained by the intra-frame compression Note that the compressed file here may be generated for each set of the image data. Alternatively, the compressed file may be generated by putting together the files of the image data group, like a moving image file.

<Advantages of the Embodiment and the Like>

The present embodiment selects the image area A which has the large spatial variation of the motion vector. Since the neighboring motion vectors vary in a large amount, such an image area A is considered to be a location which has a complicated pattern motion between the frames and has a comparatively low inter-frame correlation. Therefore, it is difficult to earn the compression efficiency by providing the inter-frame prediction differential compression to this image area A. Accordingly, the compression efficiency is increased for this image area A, by the switch to the intra-frame compression.

On the other hand, the present embodiment selects the image area B which has a small spatial variation of the motion vector. Such an image area B is considered to be a location, which has a small variation in the neighboring motion vectors and a simple pattern motion between the frames, and therefore has a comparatively high inter-frame correlation. Accordingly, the compression efficiency is increased by applying the inter-frame prediction differential compression to this image area B.

Further, the present embodiment sectionalizes the image data into the hierarchical blocks and obtains the motion vector for each of the blocks. At this time, the final section size of the block becomes small in the image area A, which has a large spatial variation of the motion vector, since the variation of the motion vector between the hierarchies is difficult to stabilize there. On the other hand, in the image area B, which has a small spatial variation of the motion vector, the final section size of the block becomes large, since the variation of the motion vector between the hierarchies is stabilized there in an early stage. Accordingly, it is possible to divide the image areas A and B appropriately by determining whether the final section size of the block is large or small.

Still further, the present embodiment terminates the block sectionalizing before the hierarchical bock section becomes smaller than the predetermined size Sc. At this time, the present embodiment assumes the block, for which the block sectionalization is terminated without satisfying the termination condition, to be the block, in which the final section size becomes smaller than the predetermined size Sc, and classifies the block into the image area A. Using such assumed processing, it is possible to omit unnecessary block sectionalizing and to realize high speed processing.

Moreover, the present embodiment carries out switching between the intra-frame compression and the inter-frame prediction differential compression depending on the image area for the luminance component. On the other hand, the intra-frame compression is carried out for the chrominance component. Generally, the chrominance component has a narrow spatial frequency band compared to the luminance component by influence of an RB pixel spacing on the Bayer arrangement of imaging elements, chrominance low-pass-filter processing in the subsequent processing, etc., and thereby the chrominance component has a comparatively small variation within the frame and a high intra-frame correlation. Therefore, for the chrominance component, it is possible to obtain a sufficiently high compression efficiency by the intra-frame compression.

<Supplement to the Embodiment>

Note that in the above embodiment, an example is described for the case using the recursive read-out function F( ). However the present invention is not limited to this case. It is optional to carry out the motion vector detection individually for each block while sectionalizing the image data hierarchically.

Further, in the above embodiment, an example is described for the case to sectionalize the image data into the rectangular blocks (refer to FIG. 8). However, the present invention is not limited to this block shape. For example, it is optional to generate a block having an outline shape of an object or a part of the object by dividing the block along an edge.

Note that the above embodiment defines the variation of the motion vector between the block hierarchies as the spatial variation and divides the image area into the image areas A and B by the magnitude determination of the spatial variation. However the present invention is not limited to this case. It is optional to define the variation of the motion vector between the neighboring blocks as the spatial variation and to divide the image area into the image areas A and B by the magnitude determination of the spatial variation.

Further, the above embodiment describes the mode of mounting the image compression device 13 on the electronic camera 11. However, the present invention is not limited to this mode. For example, the present invention may be applied to a system configured by the single image compression device 13. Further, the image compression device 13 may be realized in a software manner by use of a computer and an image processing program.

Note that the above embodiment carries out the image compression processing for the luminance and chrominance components of the image data. However, the present invention is not limited to this method. For example, it is optional to subject each of the RGB components to the same image compression processing as the image compression processing described above for the luminance component. Further, it is optional to subject only the G component to the same image compression processing as that for the luminance component and to subject the RB components to the intra-frame compression.

EXAMPLE 1

Figure 9:
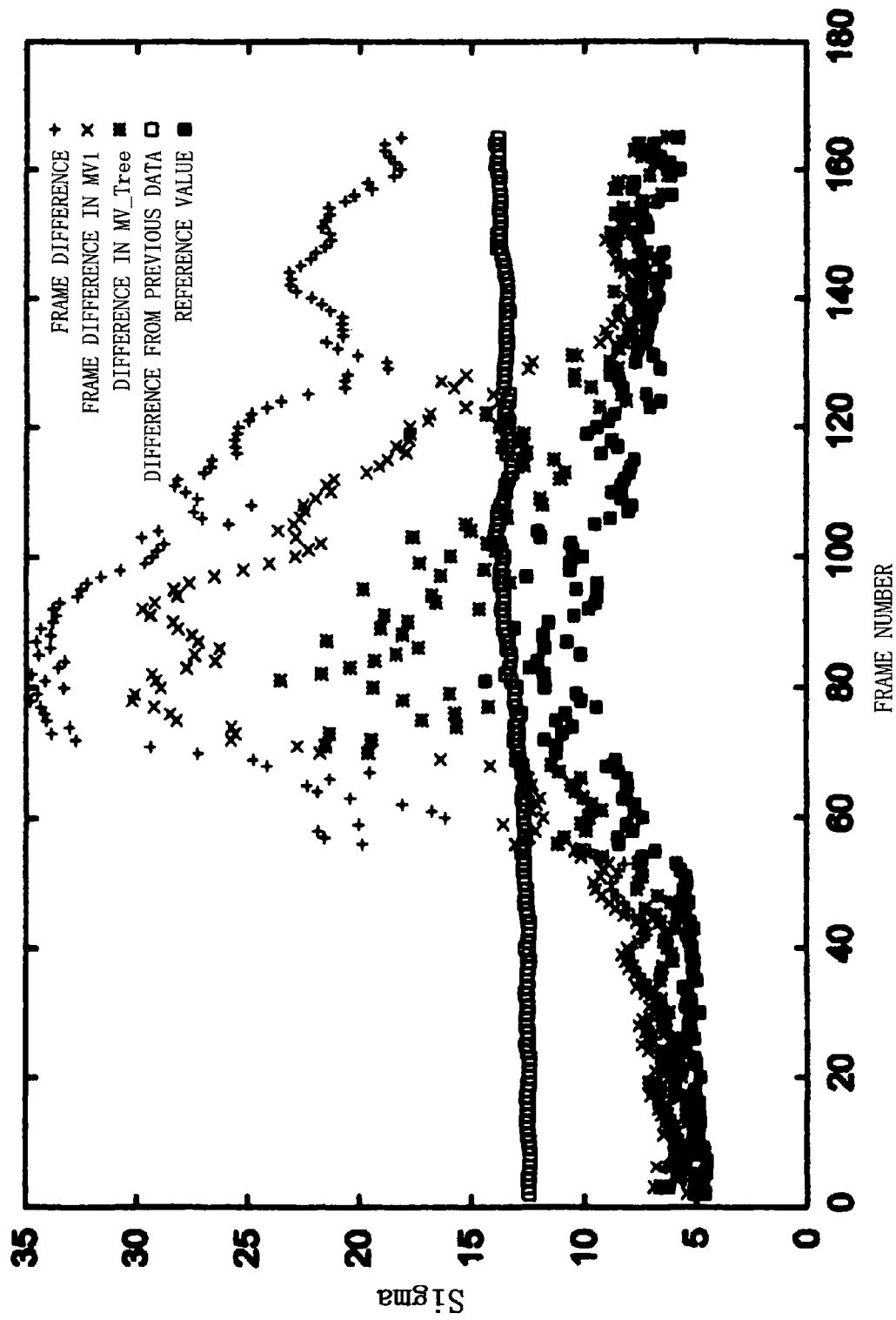
FIG. 9 is a diagram of an experimental result showing compression efficiency.
Figure 10:
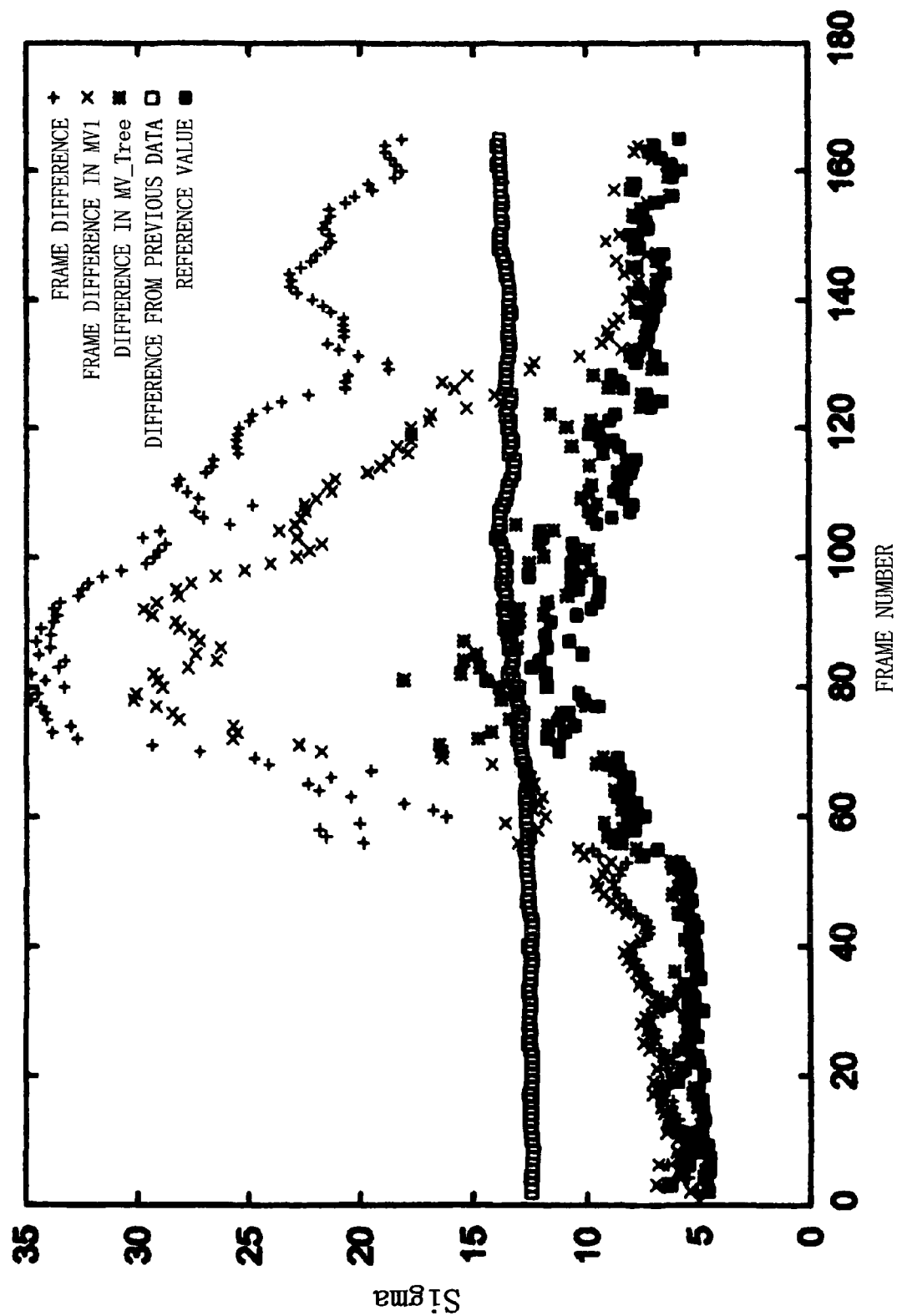
FIG. 10 is a diagram of an experimental result showing compression efficiency.
Figure 11:
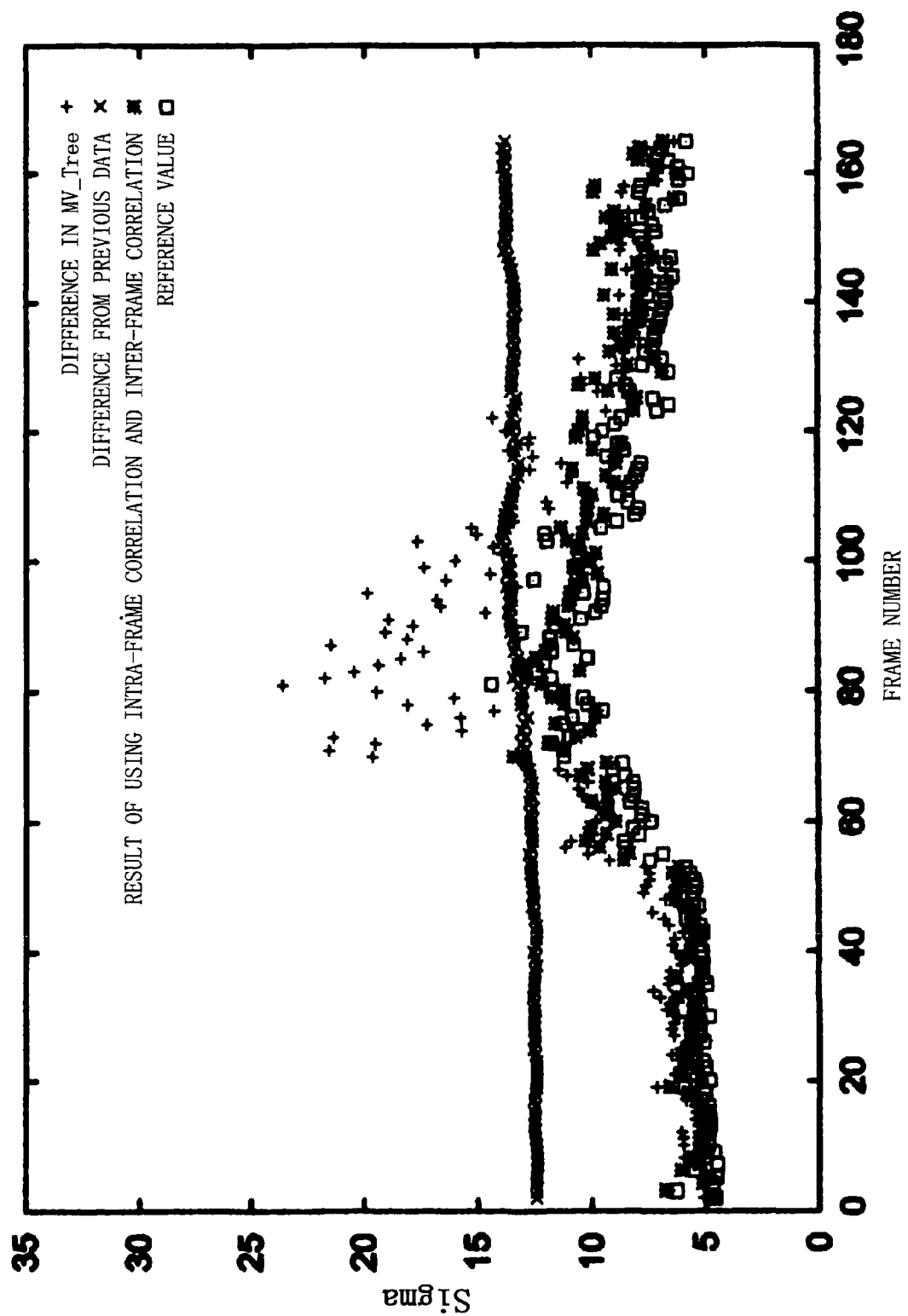
FIG. 11 is a diagram of an experimental result showing compression efficiency.

Effect of Switching Between the Intra-Frame Compression and Inter-Frame Compressions FIG. 9 to FIG. 11 are graphs, in which computation values (prediction difference or the like) were obtained for the image data group (frame numbers 0 to 180) and a standard deviation Sigma of the computation values was plotted for each of the frame numbers. Here, the symbols for the plots in the graph indicate the following compression methods, respectively.
(*) Case of obtaining the compressed data using the motion vector obtained hierarchically
(x) Case of obtaining the compressed data by carrying out the global motion compensation (reference data)
(+) Case of obtaining the compressed data without carrying out the motion compensation (reference data)
(□) Case of carrying out the intra-frame compression for the entire image area (reference data)
(■) Case of obtaining the inter-frame prediction difference using an ideal value of the motion vector which minimizes the block spatial difference (reference data)

In the following, results will be described for each of the graphs.

First, the plot (*) of FIG. 9 shows the case of having obtained the hierarchical motion vector simply by using the projection component and carrying out the inter-frame prediction differential compression for the entire image area using these motion vectors. In the frame numbers (60 to 120) which show a large motion, this plot (*) has a higher standard deviation Sigma than the plot (o) of the intra-frame compression and the improvement of the compression efficiency is limited.

The plot (*) of FIG. 10 shows the case of having obtained the motion vector using the projection component for the higher hierarchy block with a large size and obtaining the motion vector, which minimizes the spatial difference, for the lower hierarchy block with a small size. By such partial improvement, the plot (*) shows a lower standard deviation Sigma by and large, and the compression efficiency is found to be improved to some extent.

The plot (*) of FIG. 11 shows the case of having divided the image data into the image areas A and B according to the above described embodiment and switching between the intra-frame compression and the inter-frame prediction differential compression for each of the image areas A and B. In this case, the plot (*) shows a further lower standard deviation Sigma, and the compression efficiency is found to be further improved.

Figure 12:
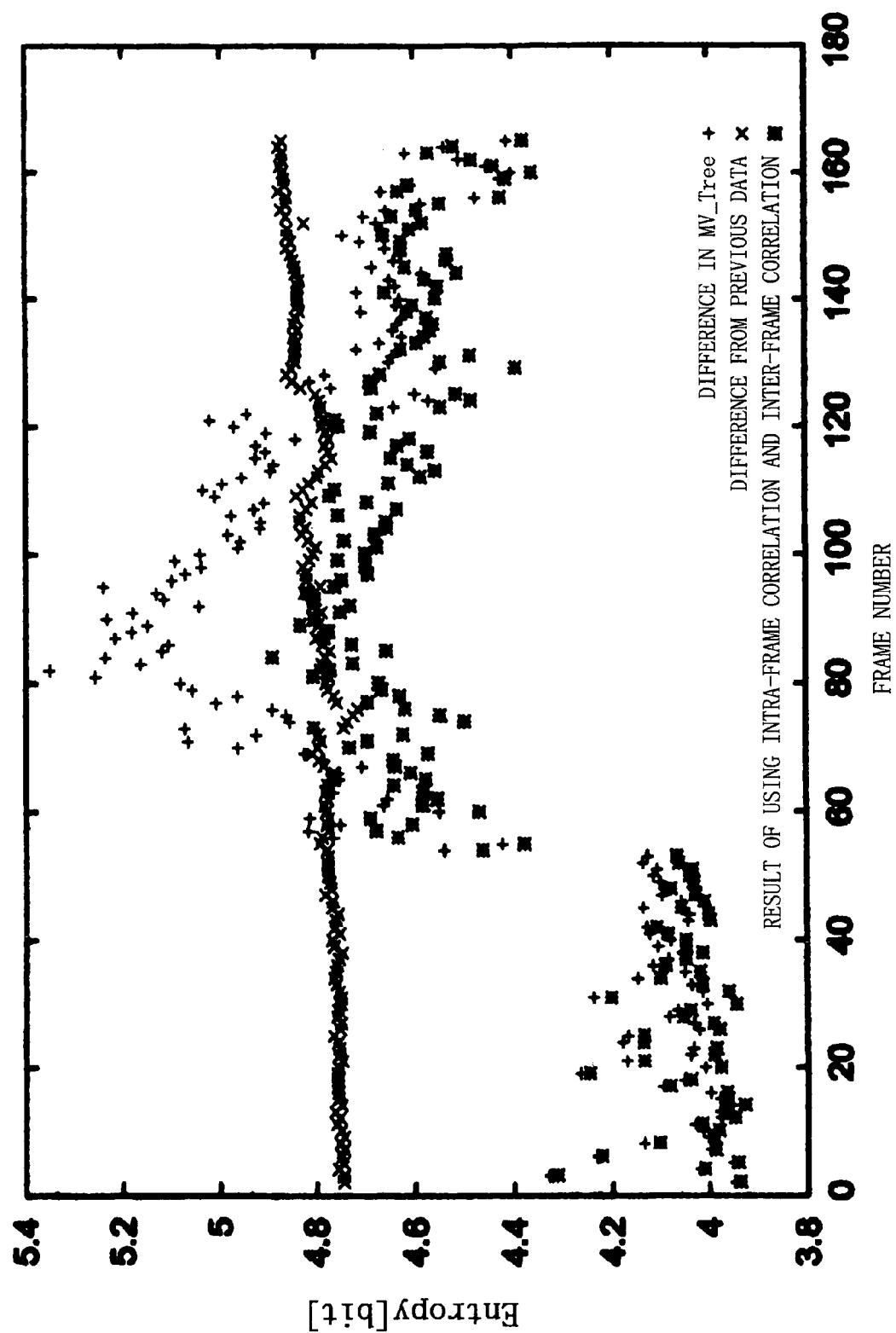
FIG. 12 is a diagram of an experimental result showing compression efficiency.

FIG. 12 shows a graph in which the standard deviation of the above FIG. 11 is converted into entropy. Also from this result, it is possible to confirm the improvement effect of the compression efficiency in the present embodiment.

EXAMPLE 2

Application to the Luminance and Chrominance Component

Next, the effect will be described for the case of applying the present embodiment to the color image data composed of the luminance and chrominance components (here, YCbCr).

Figure 13:
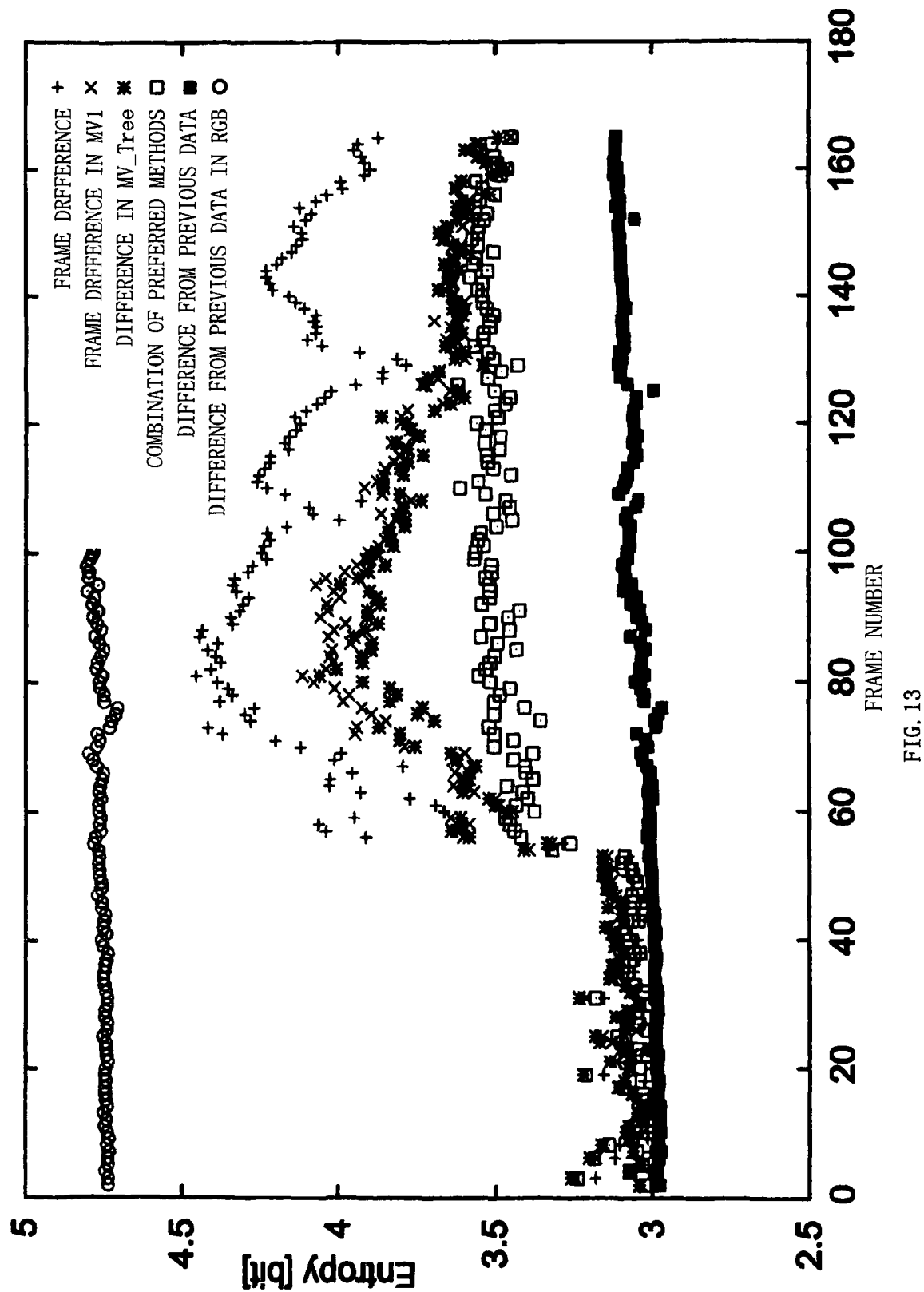
FIG. 13 is a diagram of an experimental result showing compression efficiency.

FIG. 13 is a graph in which the compressed data was obtained for the image data group (frame numbers 0 to 180) and the entropy of the compressed data was plotted for each of the frame numbers. Here, the plot symbols in the graph indicate the following compression methods, respectively.
(*) Case of carrying out the inter-frame prediction differential compression using the motion vector obtained hierarchically
(□) Case of dividing the luminance and chrominance components YCbCr into the image areas A and B and switching between the intra-frame compression and the inter-frame prediction differential compression adaptively
(x) Case of obtaining the compressed data by carrying out the global motion compensation (reference data)
(+) Case of obtaining the compressed data without carrying out the motion compensation (reference data)
(■) Case of providing the intra-frame compression to the luminance and chrominance components YCbCr (reference data)
(o) Case of subjecting the color components RGB to the intra-frame compression (reference data)

Comparing the plot (o) and the plot (■) shown in this FIG. 13, it is found that the entropy of the intra-frame compression can be reduced by approximately 1.5 bits and the compression efficiency can be improved, only by converting the RGB color space into the luminance-chrominance space.

However, comparing the plot (□) and the plot (■) shown in FIG. 13, it is found that the plot (□) shows higher entropy by and large, and the compression efficiency is lower. This is presumed to be caused by a fact that the information amount was increased by contraries due to the inter-frame prediction differential compression partially applied to the chrominance components CbCr which have small intra-frame information amount.

Figure 14:
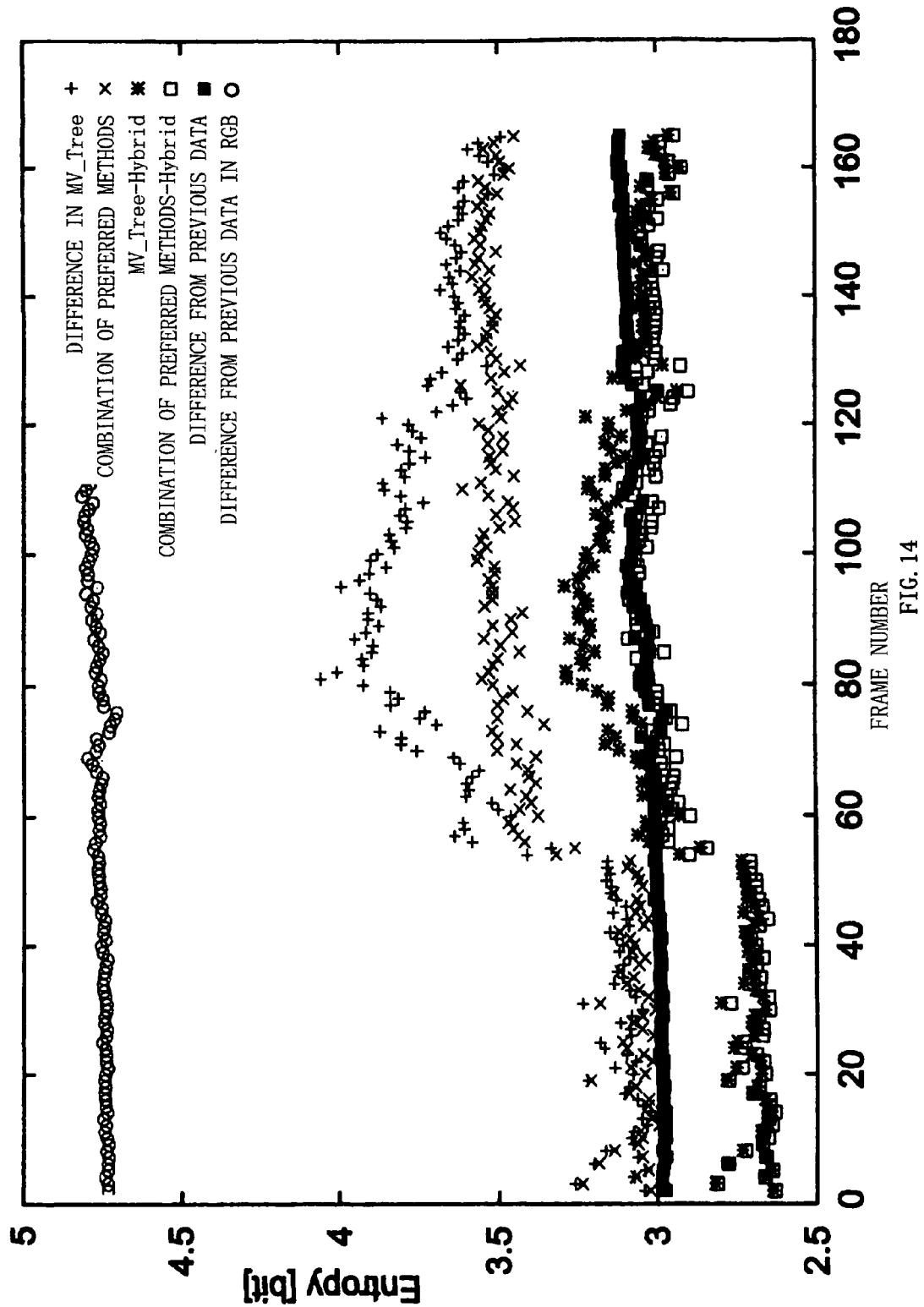
FIG. 14 is a diagram of an experimental result showing compression efficiency.

Accordingly, the compression method was switched to the intra-frame compression only for the chrominance components CrCb and the plot (□) of FIG. 14 was obtained. Comparing this plot (□) with the plot (■), it is found that the plot (□) shows lower entropy by and large and the compression efficiency is successfully improved.

Note that the present embodiment describes the processing of the luminance and chrominance components YCbCr. However, the present invention is not limited to this processing. For example, the present invention may be applied to the other luminance and chrominance components such as Lab.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image compression method compressing data of an image data group, comprising:
    obtaining a motion vector between the sets of image data for a plurality of positions on an image;
    determining whether variation of the motion vector on the image (hereinafter, called spatial variation) is large or small;
    selecting an image area A, which is determined to have the large spatial variation of the motion vector, from the image data to be compressed, and subjecting the selected image area A to intra-frame compression;
    selecting an image area B, which is determined to have the small spatial variation of the motion vector, from the image data to be compressed, and subjecting the selected image area B to inter-frame prediction differential compression;
    wherein obtaining the motion vector includes:
        performing tree-structured hierarchical block sectionalization by sectionalizing the image data into blocks and further sectionalizing the blocks; and
        first obtaining a motion vector of the block in a higher hierarchy, and with the motion vector as a starting position, searching for a motion vector of the block in a lower hierarchy;
    terminating the block sectionalization in the lower hierarchy under a termination condition that a motion vector variation of the block between the hierarchies is stabilized within a predetermined acceptable amount;
    selecting a block with a final section size being smaller than a block size of a minimum unit to carry out a motion vector detection, setting the block being selected as the image area A, and subjecting the image area A to intra-frame compression; and
    selecting a block with a final section size being larger than the block size of the minimum unit to carry out the motion vector detection, setting the block being selected as the image area B, and subjecting the image area B to inter-frame prediction differential compression, wherein
    the determination section terminates further sectionalization of the block before a hierarchical block section size becomes smaller than the block size of the minimum unit to carry out the motion vector detection,
    the intra-frame compression section assumes that a block in which block sectionalization being terminated without satisfying the termination condition is the block with the final section size being smaller than the block size of the minimum unit to carry out the motion vector detection, and subjects the block to intra-frame compression, and
    the inter-frame compression section subjects the block in which the block sectionalization being terminated by satisfying the termination condition to inter-frame prediction differential compression.

2. An image compression device compressing data of an image data group, comprising:
    a motion vector detecting section obtaining a motion vector between the sets of image data for a plurality of positions on an image;
    a determination section determining whether variation of the motion vector on the image (hereinafter, called spatial variation) is large or small;
    an intra-frame compression section selecting an image area A, which is determined to have the large spatial variation of the motion vector, from the image data to be compressed, and subjecting the selected image area A to intra-frame compression; and
    an inter-frame compression section selecting an image area B, which is determined to have the small spatial variation of the motion vector, from the image data to be compressed, and subjecting the selected image area B to inter-frame prediction differential compression;
    wherein the motion vector detecting section comprises:
        a sectionalizing section performing tree-structured hierarchical block sectionalization by sectionalizing the image data into blocks and further sectionalizing the blocks; and
        a searching section first obtaining a motion vector of the block in a higher hierarchy, and with the motion vector as a starting position, searching for a motion vector of the block in a lower hierarchy;
    the determination section terminates the block sectionalization in the lower hierarchy under a termination condition that a motion vector variation of the block between the hierarchies is stabilized within a predetermined acceptable amount;
    the intra-frame compression section selects a block with a final section size being smaller than a block size of a minimum unit to carry out a motion vector detection, sets the block being selected as the image area A, and subjects the image area A to intra-frame compression;
    the inter-frame compression section selects a block with a final section size being larger than the block size of the minimum unit to carry out the motion vector detection, sets the block being selected as the image area B, and subjects the image area B to inter-frame prediction differential compression;
    the determination section terminates further sectionalization of the block before a hierarchical block section size becomes smaller than the block size of the minimum unit to carry out the motion vector detection;
    the intra-frame compression section assumes that a block in which block sectionalization being terminated without satisfying the termination condition is the block with the final section size being smaller than the block size of the minimum unit to carry out the motion vector detection, and subjects the block to intra-frame compression; and
    the inter-frame compression section subjects the block in which the block sectionalization being terminated by satisfying the termination condition to inter-frame prediction differential compression.

3. The image compression device according to claim 2, wherein
    the image data is a color image including a luminance component and a chrominance component, and the image compression device comprises,
    a chrominance compression section subjecting the chrominance component to intra-frame compression, in which
    the luminance component is separately compressed in the image areas A and B by the intra-frame compression section and the inter-frame compression section, respectively.

4. An electronic camera, comprising:
    an image compression device according to claim 2; and
    an imaging section generating an image data group by imaging an object, wherein
    the image compression device compresses data of the image data group generated by the imaging section.

5. A non-transitory computer readable medium storing an image processing program, causing a computer to function as an image compression device according to claim 2.

* * * * *